United States Patent
Kia

(10) Patent No.: US 7,594,732 B2
(45) Date of Patent: Sep. 29, 2009

(54) AERODYNAMIC SIDE MIRROR ASSEMBLY

(75) Inventor: Hamid G. Kia, Bloomfield Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/027,362

(22) Filed: Feb. 7, 2008

(65) Prior Publication Data

US 2009/0201596 A1 Aug. 13, 2009

(51) Int. Cl.
*B60R 1/072* (2006.01)
*B60R 1/08* (2006.01)

(52) U.S. Cl. ............... 359/855; 359/841; 359/843; 359/877

(58) Field of Classification Search ........... 359/851, 359/854, 855, 866, 841, 843, 877
See application file for complete search history.

(56) References Cited

U.S. PATENT DOCUMENTS

| | | | | | |
|---|---|---|---|---|---|
| 1,338,267 | A | * | 4/1920 | Urbanek | 359/855 |
| 3,806,233 | A | * | 4/1974 | Stefano | 359/851 |
| 4,052,124 | A | * | 10/1977 | Marcus | 359/855 |
| 4,220,137 | A | * | 9/1980 | Tesch et al. | 126/702 |
| 4,913,542 | A | | 4/1990 | Adolfsson | |
| 4,989,964 | A | | 2/1991 | Meise | |
| 5,052,792 | A | * | 10/1991 | McDonough | 359/843 |
| 5,113,292 | A | * | 5/1992 | Simson | 359/851 |
| 5,235,469 | A | | 8/1993 | Horian | |
| 5,295,021 | A | * | 3/1994 | Swanson | 359/850 |
| 5,731,900 | A | | 3/1998 | Milner | |
| 6,193,377 | B1 | * | 2/2001 | Spigner | 359/602 |
| 6,390,632 | B1 | * | 5/2002 | Palathingal | 359/850 |
| 6,412,962 | B1 | * | 7/2002 | Kaspar | 359/850 |
| 6,424,474 | B1 | | 7/2002 | Milner | |
| 6,527,399 | B1 | * | 3/2003 | Palathingal | 359/866 |
| 2005/0264890 | A1 | * | 12/2005 | Morrone et al. | 359/601 |
| 2006/0181790 | A1 | * | 8/2006 | Jones, III | 359/843 |

* cited by examiner

*Primary Examiner*—Alessandro Amari
*Assistant Examiner*—Mark Consilvio
(74) *Attorney, Agent, or Firm*—Quinn Law Group, PLLC.

(57) ABSTRACT

A side mirror assembly is provided with a plurality of mirror members arranged in a longitudinal array to decrease the lateral profile of the side mirror assembly, and thereby potentially increase fuel economy, without sacrificing field of view for the driver. The mirror members are arranged with reflective surfaces angled with respect to a longitudinal axis running through the array, with the angles generally decreasing in a forward direction. An image of an object outside of the vehicle reflected by the mirror members is not reversed (i.e., the image is not a "mirror image" in which right and left sides are switched or flipped), thus increasing the ability of the driver to mentally process the image and respond in an appropriate manner. A method of manufacturing a side mirror assembly is also provided.

8 Claims, 3 Drawing Sheets

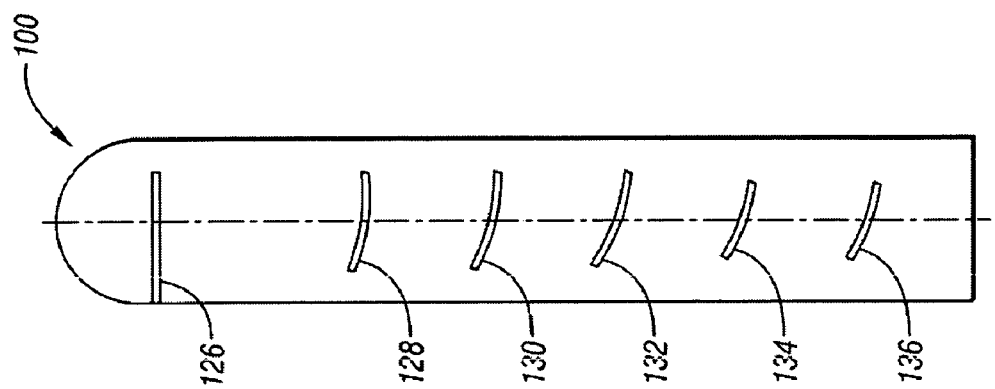
FIG. 1
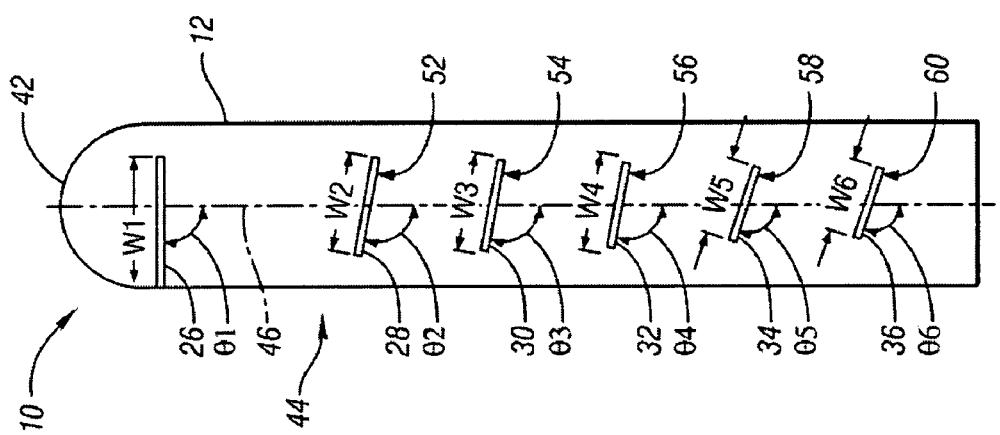
FIG. 2
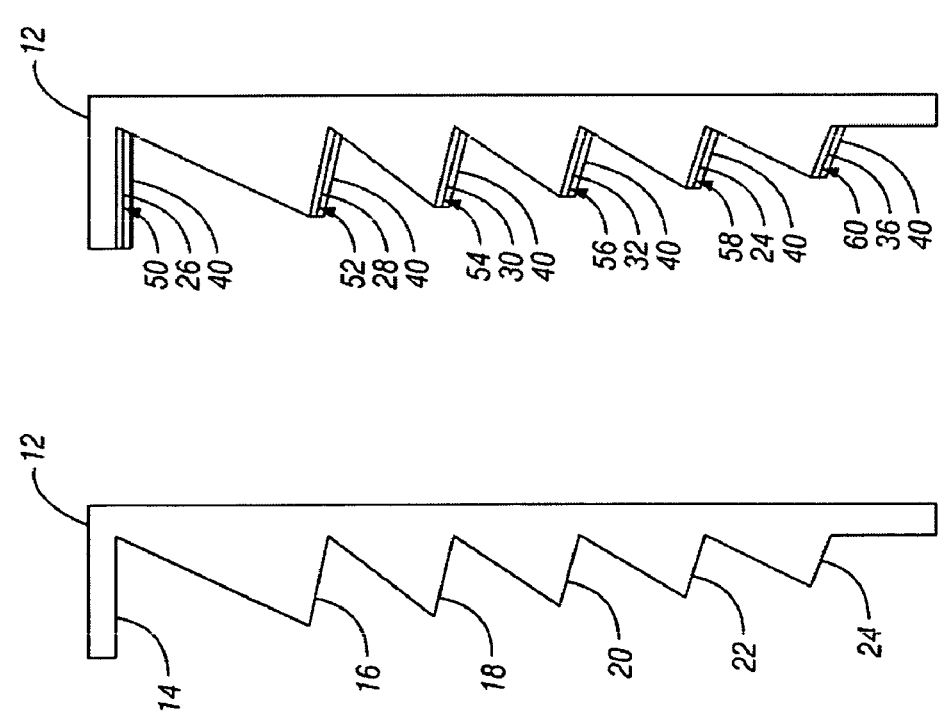
FIG. 3
FIG. 4

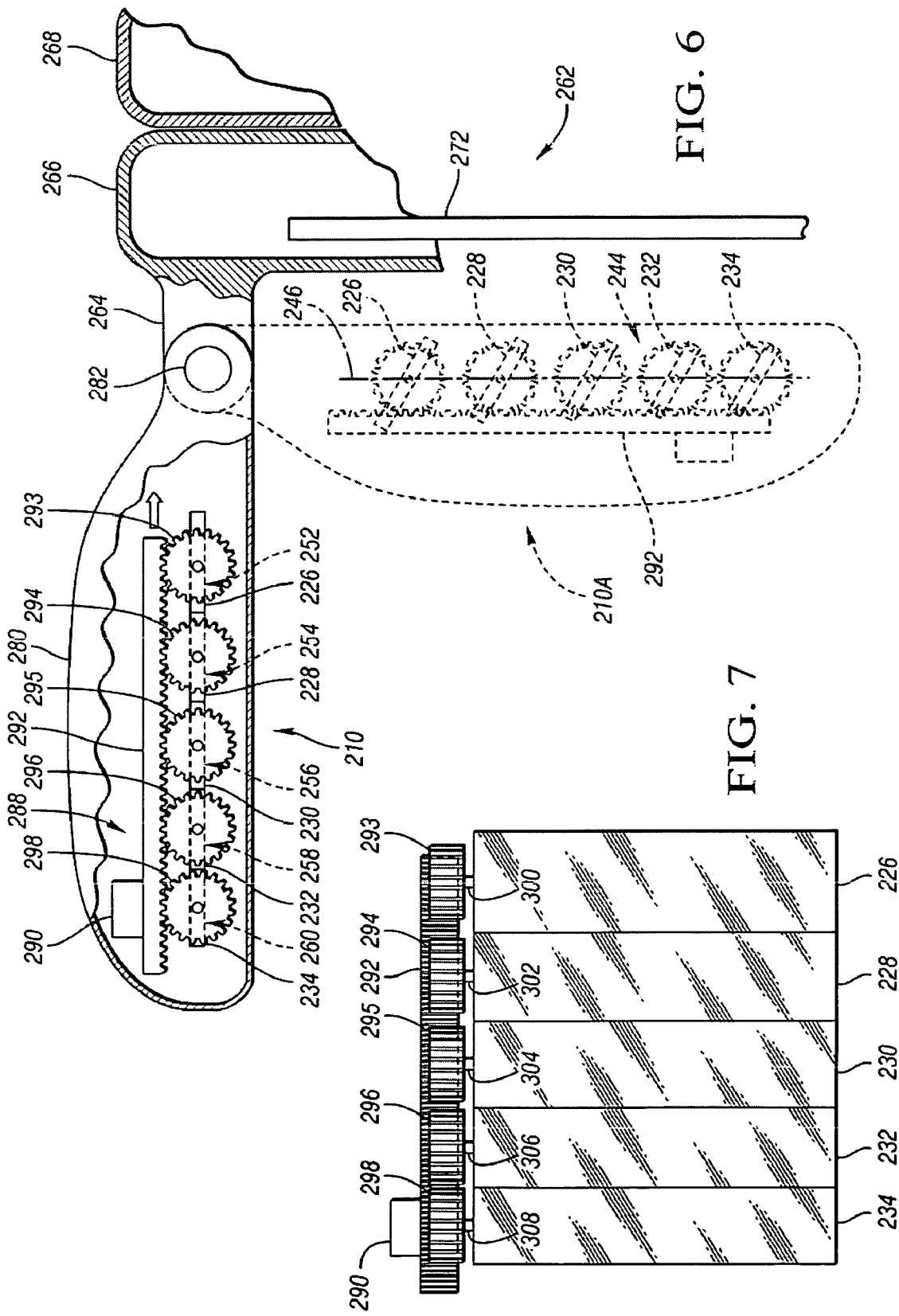

AERODYNAMIC SIDE MIRROR ASSEMBLY

TECHNICAL FIELD

The invention relates to an aerodynamic side mirror assembly and a method of manufacturing the same.

BACKGROUND OF THE INVENTION

Motor vehicles are generally equipped with side mirror assemblies that extend outboard of vehicle body structure in order to allow a driver to view images of objects outside of the vehicle and rearward of the side mirror assembly. Although side mirror assemblies are generally streamlined to the extent possible, because they increase the lateral profile of the vehicle, they nevertheless increase the drag on the motor vehicle, with a corresponding reduction in fuel economy.

SUMMARY OF THE INVENTION

A side mirror assembly is provided with a plurality of mirror members arranged in a longitudinal array to decrease the lateral profile of the side mirror assembly, and thereby potentially increase fuel economy, without sacrificing field of view for the driver. The mirror members are arranged with reflective surfaces, at least some of which are angled with respect to a longitudinal axis running through the array, with the angles generally decreasing in a forward direction along the array. An image of an object outside of the vehicle reflected by the mirror members is not reversed (i.e., the image is not a "mirror image" in which right and left sides are switched or flipped), thus increasing the ability of the driver to mentally process the image and respond in an appropriate manner.

In one embodiment, the mirror members may be selectively moved from the configuration described above, to a configuration in which the mirror members are arranged to form the equivalent of a continuous, planar mirror member. The change in configuration may be in response to a change in vehicle speeds, with the longitudinal array being used for high vehicle speeds and the substantially contiguous, planar arrangement being used for lower vehicle speeds in which aerodynamic drag is less affected by the side mirror assembly. A drive assembly may be used to automatically change the configuration of the mirror members in response to a repositioning of a housing for the side mirror assembly with respect to the vehicle.

At least some embodiments of the side mirror assemblies described herein may be manufactured by a method that includes injection molding a substantially transparent base that has surfaces spaced apart from one another in a longitudinally-oriented array. At least some of the surfaces are not parallel with one another and are positioned at obtuse angles with respect to longitudinal axis running through the surfaces. The surfaces are aluminized to form reflective mirror members on the surfaces. A clear protective coating may be placed on the aluminized surfaces. The aluminized surfaces are then overmolded with additional transparent material, as was used for the base, to encase the reflective mirror members within this material.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration in plan view of a partially formed side mirror assembly having a transparent base member with stepped base surfaces;

FIG. 2 is a schematic illustration in plan view of the transparent base member of FIG. 1, with the stepped base surfaces having aluminized mirror members thereon and with a protective coating over the mirror members;

FIG. 3 is a schematic illustration in plan view of the side mirror assembly of FIGS. 1 and 2 with the transparent base member overmolded to encase the stepped base surfaces and mirror members;

FIG. 4 is an alternative embodiment of a side mirror assembly formed according to the method illustrated in FIGS. 1-3, but having aluminized mirror members with a convex shape;

FIG. 6 is a schematic illustration in fragmentary, partial cross-sectional plan view of a third embodiment of a side mirror assembly, illustrating the side mirror assembly in two positions with respect to a vehicle body, with the mirror members moving from a first configuration (shown in phantom) to a second configuration via a drive assembly when the position of the side mirror assembly is changed; and FIG. 7 is a partial front view of the side mirror assembly of FIG. 6, showing the mirror members in the second configuration.

DESCRIPTION OF THE PREFERRED EMBODIMENTS

Figure 5:
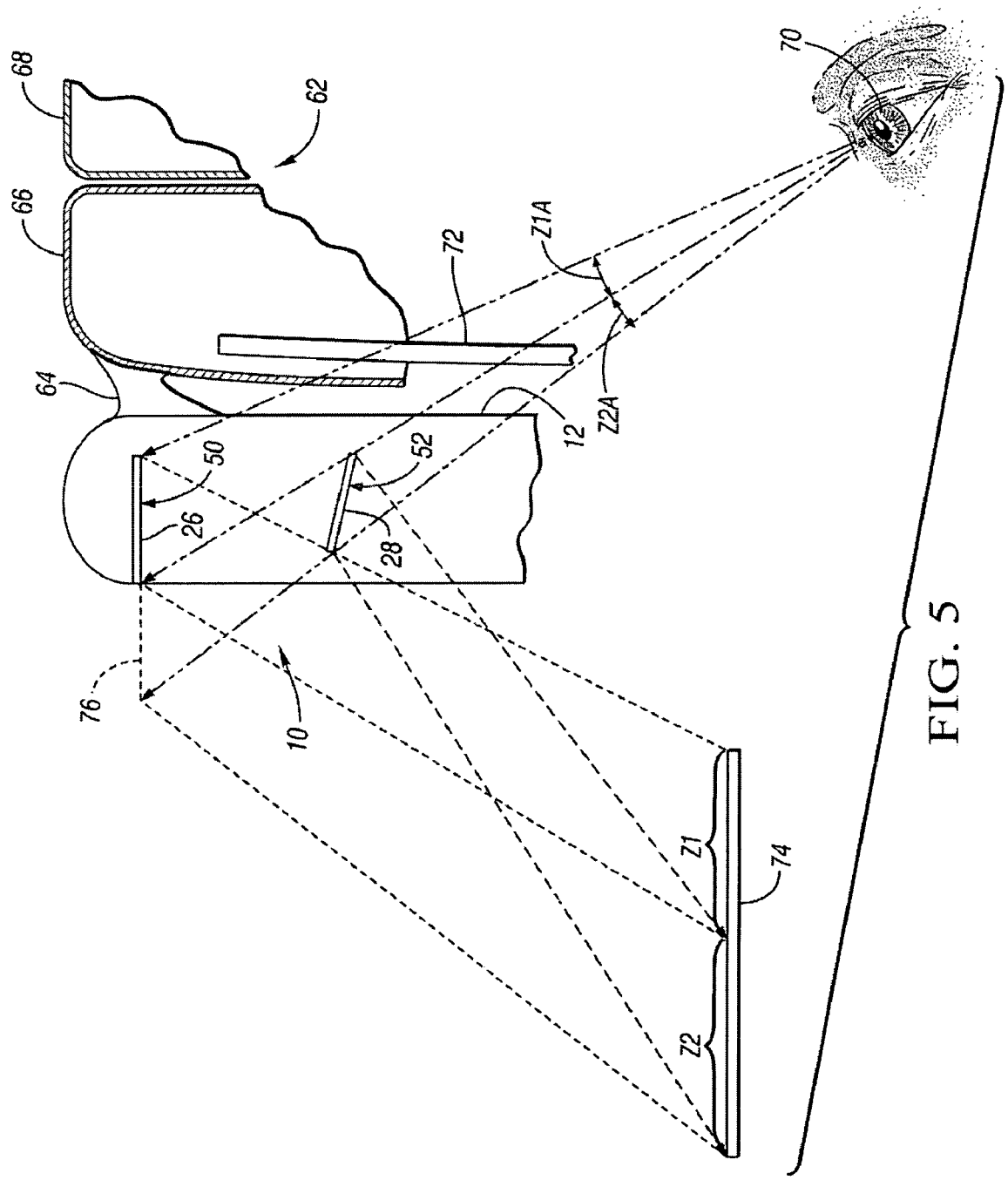
FIG. 5 is a schematic illustration in fragmentary, partial cross-sectional plan view of the side mirror assembly of FIGS. 1-3 mounted to a vehicle, and illustrating reflection of an image by the mirror members without reversing the image.

Referring to the drawings, wherein like reference numbers refer to like components, FIGS. 1-3 illustrate a method of manufacturing a first embodiment of a side mirror assembly 10, shown in FIG. 3. In FIG. 1, a base member 12 is formed by blow-molding. The base member 12 is a transparent plastic material having stepped surfaces 14, 16, 18, 20, 22, and 24. As illustrated in FIG. 2, the stepped surfaces 14, 16, 18, 20, 22, and 24 are aluminized to form mirror members 26, 28, 30, 32, 34 and 36 on the respective stepped surfaces. A clear protective coating 40 is coated over each of the mirror members 26, 28, 30, 32, 34 and 36. As illustrated in FIG. 3, the base member 12 with stepped surfaces 14, 16, 18, 20, 22, and 24 and mirror members 26, 28, 30, 32, 34 and 36 is then overmolded, i.e., additional transparent material as was used to form base member 12 is molded over base member 12 to form a final molded shape in which the mirror members 26, 28, 30, 32, 34 and 36 are encased in the transparent plastic material. The stepped surfaces 14, 16, 18, 20, 22, and 24 and the protective coating 40 shown in FIGS. 1 and 2 are not apparent after the over-molding to the final shape of FIG. 3. Blow-molding to the final shape of the side mirror assembly 10 adds a rounded forward surface 42 which is forward facing when the side mirror assembly 10 is mounted to a vehicle body, as shown in FIG. 5, to add to the aerodynamic nature of the elongated side mirror assembly 10.

Referring to FIG. 3, the mirror members 26, 28, 30, 32, 34, and 36 are spaced apart from one to another in a longitudinally-oriented array 44 oriented with a longitudinal axis 46 extending through the mirror members 26, 28, 30, 32, 34, and 36. Referring again to FIG. 2, in this embodiment, each of the mirror members 26, 28, 30, 32, 34, and 36 has a respective substantially planar reflective surface 50, 52, 54, 56, 58, and 60. As is clear in FIG. 3, the reflective surfaces 50, 52, 54, 56, 58, and 60, are positioned at various angles with respect to the longitudinal axis 46. The reflective surface 50 is at an angle θ1 of approximately 90 degrees with respect to the longitudinal axis 46. The reflective surfaces 52, 54, 56, 58, and 60 are at various angles θ2, θ3, θ4, θ5, and θ6 with respect to the longitudinal axis 46. Each of the angles θ2, θ3, θ4, θ5, and θ6 is obtuse (i.e., greater than 90 degrees). At least some of the various angles θ1, θ2, θ3, θ4, θ5, and θ6 are different from one another. Generally, the angles increase from θ2 to θ6.

Additionally, each of the mirror members, 26, 28, 30, 32, 34, and 36 is characterized by a respective width W1, W2, W3, W4, W5, and W6. The widths generally increase from W6 to W1, i.e. the widest mirror member 26 is oriented at the end of the mirror assembly 10 intended to be toward the front of the vehicle, while the narrowest mirror member 36 with a width W6 is rearward. Preferably, the widths of the mirror members increase in order as follows: W6, W5, W4, W3, W2, and W1. The different widths of the mirrors account for the variation in distance that light must go through in traveling from the object 74 of FIG. 5 to the eye 70. The widths may also be designed to account for different reflective indices of the media (i.e., air, base member 12, then air) that the light travels through. The preferred size of the angles θ1, θ2, θ3, θ4, θ5, and θ6 and widths W1, W2, W3, W4, W5, and W6 along the longitudinal array 44 allows the side mirror assembly 10 to reflect an image of an object outside of a vehicle without reversing the image. This is indicated in FIG. 5, which shows a fragmented portion of the side mirror assembly 10 mounted to a vehicle 62. Specifically, the side mirror assembly 10 is mounted via a mounting member 64 to a vehicle door 66 in a longitudinal position substantially aligned with the position of an A-pillar member 68. The mounting member 64 may be of a plastic, metal, or other sufficiently rigid and strong material to retain the side mirror assembly 10 to the door 66. With the side mirror assembly 10 operatively connected to the vehicle 62 in this manner, a driver positioned in a driver's seat, indicated by a schematic representation of an eye 70 can utilize the side mirror assembly 10 by looking through the window 72 to view an object 74 located outside of the vehicle 62 without reversing an image of the object 74. The mounting member 64 may be pivotable to allow adjustment of the mirror members 26, 28, 30, 32 and 34 with respect to the position of the eye, especially for different eye positions of different drivers.

As illustrated in FIG. 5, the object 74 is divided into zones Z1 and Z2. The closest zone Z1, i.e., the zone most inboard and therefore closest to the viewer, has an image reflected by the mirror member 26 to the eye 70 in a viewing zone Z1A. As used herein, "inboard" refers to a direction laterally inward toward a longitudinal centerline of a vehicle. "Outboard" refers to a direction laterally outward from a longitudinal centerline of the vehicle. The zone Z2 of the object 74 has an image reflected by the mirror member 28, which is closer to the eye 70 and at a greater angle θ2 to the longitudinal axis 46, as shown in FIG. 3, and therefore able to reflect the further outboard zone Z2A in a viewing zone Z1A. The boundaries of light reflected from the object 74 off of the respective reflective surfaces 50, 52 to the eye 70 is marked by phantom lines coincident with the opposing ends of the respective reflective surfaces 50, 52; such boundaries establish the zones Z1, Z2 and the viewing zones Z1A, Z2A. It is assumed to any refraction of light entering and exiting the base material 12 prior to reflection off of the mirror members 26, 28 is negligible. However, the angles of the mirror members 26, 28, 30, 32, 34, and 36 with respect to the longitudinal axis 46 as well as the widths W1, W2, W3, W4, W5 and W6 may be adjusted to take such refraction into account so that the object 74 is reflected by the mirror members 26, 28, 30, 32, 34 and 36 without reversal of the image as described above.

The mirror member 28 reflects zone Z2 in place of a mirror portion 76 of mirror member 26 that would have been needed to extend outboard from mirror member 26 in order to reflect an image of the same zone Z2. The additional mirror members 30, 32, 34 and 36, having reflective surfaces 54, 56, 58 and 60 being at respectively increasing angles with respect to the longitudinal axis 46 of FIG. 3, reflect zones respectively in order outboard from zone Z2, creating additional viewing zones respectively in order moving counterclockwise from viewing zone Z2A, extending the field of vision outboard of object 74. Respectively larger mirror portions of a mirror would need to extend outboard of mirror portion 76 to cover the same field of vision. Thus, by stacking the mirror members 26, 28, 30, 32, 34 and 36 in a longitudinal array 44, the same field of vision is viewable as with a much wider single plane mirror, and this achieved without reversing the image. The side mirror assembly 10 extends much less outboard of the vehicle door 66 than would a single mirror offering the same field of vision, thus minimizing the drag affect of the side mirror assembly 10 on the vehicle 62. By increasing by hundreds or even thousands the number of mirror members of side mirror assembly 10, while decreasing the width of the mirror members, the side mirror assembly 10 may offer a relatively wide field of vision with an almost paper thin overall width.

FIG. 4 shows an alternative embodiment of a side mirror assembly 100 manufactured according to the same method described with respect to FIGS. 1-3. The stepped surfaces (no longer visible in the FIG. 4) of the base member used in forming the side mirror assembly 100 are slightly convex, so that the aluminized mirror members 126, 128, 130, 132, 134 and 136 aluminized on the stepped surfaces have a convex shape, allowing each to have a wider view, as is understood by those skilled in the art.

The side mirror assemblies 10 and 100 may thus be manufactured according to a method, described with respect to side mirror assembly 10, that requires injection molding a substantially transparent base 12 so that the base 12 has stepped surfaces 14, 16, 18, 20, 22 and 24 spaced apart from one another in a longitudinally-oriented array 44 in which at least some of the stepped surfaces 14, 16, 18, 20, 22 and 24 are not parallel with one another and are positioned at obtuse angles θ2, θ3, θ4, θ5, and θ6 with respect to the longitudinal axis 46. The stepped surfaces 14, 16, 18, 20, 22 and 24 are then aluminized to create respective reflective surfaces 50, 52, 54, 56 58 and 60 thereon. After that, a clear protective coating 40 may be coated over each of the reflective surfaces 50, 52, 54, 56, 58 and 60 prior to over-molding the aluminized surfaces to encase the mirror members 26, 28, 30, 32, 34 and 36 within transparent plastic.

Referring to FIGS. 6 and 7, another embodiment of a side mirror assembly 210 is shown that is selectively movable between a low speed position best suited for relatively low vehicle speeds, where aerodynamic drag is less significant, and a high speed position 210A, shown in phantom, that extends much less outboard of a vehicle 262 than when in the low speed position. The side mirror assembly 210 is mounted to a vehicle door 266 via a mounting member 264 at a longitudinal position on the vehicle 262 roughly equivalent with an A-pillar member 268 to which the door 266 is hinged. The side mirror assembly 210 includes a housing 280 pivotably attached to the mounting member 264, and movable either manually or via a motor acting on a pivot member 282 between the low speed and high speed positions. The housing 280 is shown fragmented in order to view a plurality of mirror members 226, 228, 230, 232, and 234 arranged with respective reflective surfaces 252, 254, 256, 258 and 260 in a planar configuration, referred to herein as a second configuration. In the planar configuration, the reflective surfaces 252, 254, 256, 258, and 260 lie in a single plane, and function the same as a single mirror pane of equivalent size.

When the housing 280 moves to the high speed position 210A, the mirror members 226, 228, 230, 232 and 234 are controlled to move to a first configuration in which the mirror members 226, 228, 230, 232 and 234 are positioned in a longitudinal array 244 with a longitudinal axis 246 running therethrough. The mirror members 226, 228, 230, 232 and 234 are of increasing widths from mirror member 234 to mirror member 226, rearward to frontward with respect to the vehicle 262. Additionally, the mirror members 226, 228, 230, 232, and 234 have respective reflective surfaces disposed at decreasing angles with respect to the longitudinal axis 246 rearward to frontward, as described with respect to corresponding mirror members 26, 28, 30, 32 and 34 in the embodiment of FIG. 3. Thus, the mirror members 226, 228, 230, 232 and 234 reflect an image of an object outside of the vehicle 262 without reversing the image to an occupant (not shown) seated inside of the vehicle 262 (i.e., on the opposite side of window 272 from the side mirror assembly 210. As the side mirror assembly 210 is moved between the low speed and high speed positions, a drive assembly 288 causes the mirror members 226, 228, 230, 232 and 234 to move between the planar configuration and the longitudinal array configuration. The drive assembly 288 includes a motor 290 that drives a worm gear 292 in the direction of the arrow shown to move from the planar configuration to the configuration of the longitudinal array 244 as the housing 280 is moved. The worm gear 292 intermeshes with gears 293, 294, 295, 296 and 298 to turn the gears 293, 294, 295, 296 and 298 a respective amount relative to the worm gear 292 that depends on the tooth ratio of the respective gears 293, 294, 295, 296 and 298 to the worm gear. Each respective gear 293, 294, 295, 296 and 298 is mounted via a respective shaft 300, 302, 304, 306 and 308 for common rotation with a respective one of the mirror members, as best shown in FIG. 7. Thus, by choosing appropriate gear counts for the gears 293, 294, 295, 296 and 298 relative to the worm gear 292, the angle of the reflective surfaces of the mirror members 226, 228, 230, 232 and 234 to the longitudinal axis 246 is controlled and the correct configuration of mirror members is assured. FIG. 7 shows the mirror members 226, 228, 230, 232 and 234 in the planar configuration with the mirror surfaces effectively forming a single continuous mirror pane.

While the best modes for carrying out the invention have been described in detail, those familiar with the art to which this invention relates will recognize various alternative designs and embodiments for practicing the invention within the scope of the appended claims.

The invention claimed is:

1. An aerodynamic side mirror assembly operatively connectable to a vehicle for viewing an object outside of the vehicle, comprising:
    a plurality of mirror members; wherein each of the mirror members has a respective reflective surface; wherein the mirror members are spaced apart from one another and stacked front to back in a longitudinally-oriented array running fore and aft with respect to the vehicle, establishing a longitudinal axis running through the surfaces when the mirror is connected to the vehicle; wherein at least some of the reflective surfaces are not parallel with one another; wherein the reflective surfaces are positioned to reflect an image of the object without reversing the object relative to a viewer inside of the vehicle, and regardless of a distance of the object rearward of a foremost one of the mirror members;
    wherein the longitudinally-oriented array is a first configuration of the mirror members, and
    a drive member operable to move the mirror members from the first configuration to a second configuration wherein the reflective surfaces of the mirror members lie in a single plane.

2. The aerodynamic side mirror assembly of claim 1, wherein at least some of the mirror members are of different widths; and wherein the different widths increase along the longitudinally-oriented array toward the front of the vehicle.

3. The aerodynamic side mirror assembly of claim 1, wherein at least some of the reflective surfaces are positioned at obtuse angles with respect to the longitudinal axis running through the reflective surfaces.

4. The aerodynamic side mirror assembly of claim 1, wherein the mirror members are enclosed within a substantially transparent base; and wherein the base is mounted to the vehicle.

5. The aerodynamic side mirror assembly of claim 1, wherein at least some of the reflective surfaces have a convex shape.

6. An aerodynamic side mirror assembly operatively connectable to a vehicle for viewing an object outside of the vehicle, comprising:
    a plurality of mirror members; wherein each of the mirror members has a respective reflective surface;
    a drive assembly operable to move the mirror members between a first configuration and a second configuration;
    wherein the mirror members are spaced apart from one another and stacked front to back in a longitudinally-oriented array running fore and aft with respect to the vehicle, establishing a longitudinal axis running through the surfaces in the first configuration when the mirror is connected to the vehicle such that at least some of the reflective surfaces are not parallel with one another; wherein the reflective surfaces are positioned to reflect an image of the object without reversing the object relative to a viewer inside of the vehicle;
    wherein the reflective surfaces of the mirror members lie in a single plane in the second configuration; and wherein the side mirror assembly extends further outboard of the vehicle in the second configuration.

7. The aerodynamic side mirror assembly of claim 6, wherein the drive assembly includes a worm gear and a plurality of gears intermeshing with the worm gear; wherein each of the plurality of gears is operatively connected with a respective one of the mirror members; and wherein the mirror members rotate with respect to the worm gear when the drive assembly moves the mirror members between the first configuration and the second configuration.

8. The aerodynamic side mirror assembly of claim 6, wherein at least some of the mirror members are of different widths; and wherein the different widths increase along the longitudinally-oriented array toward the front of the vehicle.

* * * * *